United States Patent [19]
Benzel

[11] Patent Number: 6,125,224
[45] Date of Patent: Sep. 26, 2000

[54] ORDERED STRUCTURE OPTICAL FIBER RIBBON BUNDLE

[75] Inventor: David Benzel, Neully sur Seine, France

[73] Assignee: Alcatel, Paris, France

[21] Appl. No.: 08/954,097

[22] Filed: Oct. 20, 1997

[30] Foreign Application Priority Data

Oct. 24, 1996 [FR] France ................................. 96 12980

[51] Int. Cl.$^7$ ................................................. G02B 6/44
[52] U.S. Cl. ........................... 385/114; 385/100; 385/115
[58] Field of Search .................................. 385/100, 102, 385/106, 114, 115, 137

[56] References Cited

U.S. PATENT DOCUMENTS

| | | | |
|---|---|---|---|
| 5,276,759 | 1/1994 | Nguyen et al. | 385/114 |
| 5,293,443 | 3/1994 | Eoll et al. | 385/114 |
| 5,369,720 | 11/1994 | Parry et al. | 385/114 |
| 5,561,730 | 10/1996 | Lochkovic et al. | 385/114 |
| 5,621,842 | 4/1997 | Keller | 385/114 |
| 5,848,212 | 12/1998 | Wagman | 385/111 |

FOREIGN PATENT DOCUMENTS

| | | | |
|---|---|---|---|
| 0122169A2 | 10/1984 | European Pat. Off. | 385/110 |
| 3526823A1 | 2/1987 | Germany | 385/100 |
| 4101802C1 | 5/1992 | Germany | 385/100 |
| 4040715A1 | 6/1992 | Germany | 385/114 |
| 2271589 | 4/1994 | United Kingdom | 385/114 |

*Primary Examiner*—John D. Lee
*Assistant Examiner*—Victoria D. Hao
*Attorney, Agent, or Firm*—Sughrue, Mion, Zinn, Macpeak & Seas, PLLC

[57] ABSTRACT

An optical fiber bundle comprises optical fiber ribbons disposed one on the other to constitute a stack having a side formed by an edge of each ribbon and which extends in a substantially transverse direction to the ribbons. An adhesive member is placed on this side of the stack. It adheres to the lateral edge of each ribbon to bind them. It preserves the ordered structure of the bundle when the bundle is inserted into a cable jacket.

7 Claims, 1 Drawing Sheet

UV SOURCE

ORDERED STRUCTURE OPTICAL FIBER RIBBON BUNDLE

BACKGROUND OF THE INVENTION

1. Field of the Invention

The invention concerns optical fiber cables and in particular a bundle of optical fibers for fabricating such cables in which the optical fibers are assembled in an ordered form.

2. Description of the Prior Art

For fabricating a cable it is desirable for the optical fibers of the bundle to be selectively identifiable at the ends of the cable after the bundle of fibers has been inserted into the jacket of the cable. It is also desirable to prevent excessively high compression stresses, due to the characteristics of he assembly, from being exerted on the optical fibers because such stresses increase attenuation in the optical fibers.

In one prior art solution the bundle of optical fibers is twisted to hold the optical fibers in place during insertion into the jacket. However, this technique induces compression stresses on the fibers, which is undesirable.

German patent document DE-35 26 823 describes an ordered structure optical fiber bundle in which optical fiber ribbons are stacked one on the other, the ribbons being joined together by their top and bottom faces to prevent relative displacement between the ribbons during insertion of the bundle into the jacket.

In German patent document DE-41 01 082 the ribbons are stacked by virtue of being inserted into slots of a prefabricated structure which holds the ribbons in place during insertion into the jacket.

The aim of the invention is to propose another assembly configuration for binding the ribbons without generating stresses on the optical fibers and which preserves the order of the fibers in the bundle to enable easy identification of the fibers when the bundle is inserted in the jacket.

SUMMARY OF THE INVENTION

To this end, the invention consists in a bundle of optical fibers assembled together in an ordered form comprising a plurality of optical fiber ribbons disposed one on the other to constitute a stack having a side formed by an edge of each ribbon, said side extending in a substantially transverse direction to said ribbons, and an adhesive member placed on said side of said stack and adhering to said lateral edge of each ribbon to bind said ribbons.

An adhesive member of this kind preserves the ordered structure of the bundle during its insertion in the jacket. It does not create any compression stresses on the optical fibers. It also enables a large number of optical fibers to be assembled together with a small jacket cross-section.

The invention is described in more detail below with reference to the drawings.

DETAILED DESCRIPTION OF THE PREFERRED EMBODIMENT

Figure 1:
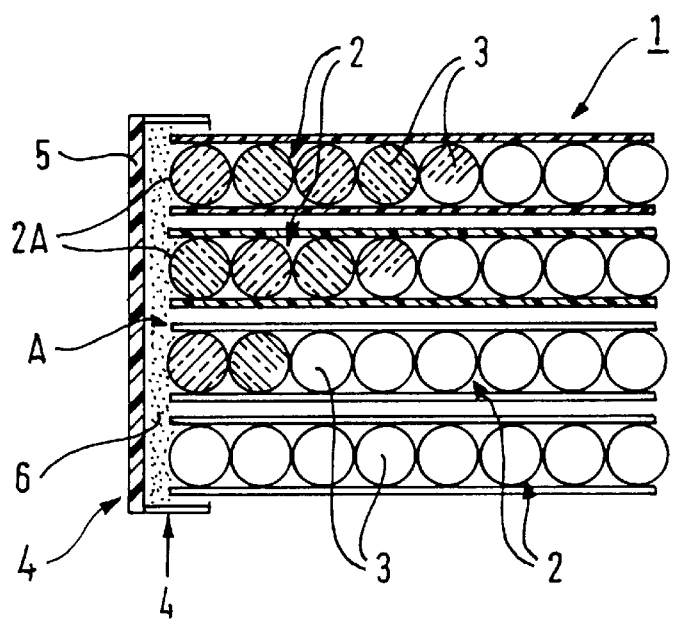
FIG. 1 shows a bundle of optical fibers in accordance with the invention in cross-section.

Referring to FIG. 1, the bundle 1 of optical fibers comprises a plurality of optical fiber ribbons, in this example four such ribbons 2 disposed one on the other to constitute a stack of ribbons shown here in cross-section.

It can be seen that each ribbon comprises a set of parallel optical fibers 3. Each fiber 3 is coated with a material that isolates it from the neighboring fibers and which holds the fibers of a ribbon in a substantially plane configuration. In the FIG. 1 example, the fibers of a ribbon are either laminated in the matrix of the ribbon between two insulative material films or encapsulated.

As can be seen in this figure, the stack of ribbons 2 has a side A formed by a lateral edge 2A of each ribbon. This side A extends in a substantially transverse direction to the ribbons 2 (perpendicularly or in a oblique direction) and an adhesive member 4 is placed on this side of the stack to adhere to the edge 2A of each ribbon to bind the ribbons together.

In this way each ribbon is held in place in the structure of the bundle when the bundle is inserted into a jacket to fabricate a cable.

Note that a ribbon can be removed from the bundle of optical fibers without compromising the cohesion of the structure of the bundle.

The adhesive member 4 can be a film of adhesive or a strip 5 of a synthetic material coated with a resin 6 that can be hardened by UV (ultraviolet) radiation.

Figure 2:
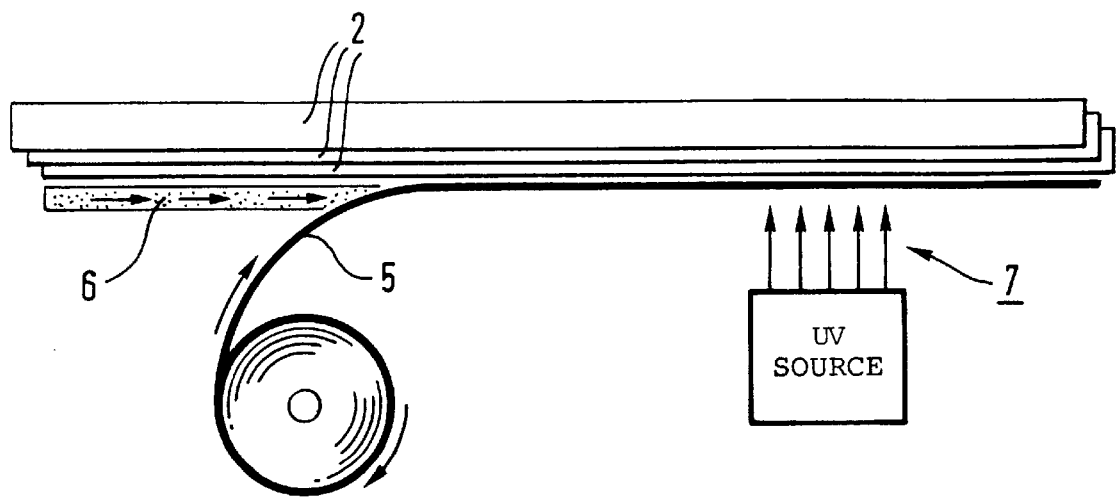
FIG. 2 shows a method of fabricating a bundle of optical fibers in accordance with the invention.

FIG. 2 shows in a highly schematic fashion a method of assembling ribbons using a strip 5 coated with a resin hardened by UV radiation.

The optical fibers ribbons 2 are disposed face to face on edge on top of the strip 5. The strip 5 can be coated with resin 6 at the same time as it is fed off a spool under the ribbons 2. When the ribbons 2 are laid on edge on the face of the strip 5 coated with resin, the resin 6 is hardened by UV radiation 7 to bind the ribbons.

Accordingly, each ribbon is correctly positioned in a cable and retains its position in the cable during cablemaking operations without destruction of the matrix so constituted, which is not the case if the ribbons are not bound together.

There is claimed:

1. A bundle of optical fibers assembled together in an ordered form comprising:

a plurality of optical fiber ribbons disposed one on the other to constitute a stack, said stack having a side formed by a lateral edge of each of said ribbons, said side extending in a substantially transverse direction to said ribbons, and a member coated with an adhesive material and placed on said side of said stack and adhering to said lateral edge of each of said ribbons to bind said ribbons together.

2. The bundle claimed in claim 1, wherein said member is a strip coated with said adhesive material.

3. The bundle claimed in claim 2 wherein said adhesive material is a resin adapted to be hardened by UV radiation.

4. A cable fabricated from a bundle of optical fibers as claimed in clam 1.

5. The bundle claimed in claim 1, wherein said member is a non-tubular member.

6. The bundled claimed in claim 1, wherein said member is a substantially planar member.

7. A bundle of optical fibers assembled together in an ordered form within a housing, comprising:

a plurality of optical fiber ribbons disposed one on the other to constitute a stack, said stack disposed within said housing and having a side formed by a lateral edge of each of said ribbons, said side extending in a substantially transverse direction to said ribbons; and an adhesive applied on said side of said stack and adhering to said lateral edge of each of said ribbons to bind said ribbons together;

wherein a space between said housing and said stack is partially but not completely filled with said adhesive.

* * * * *